United States Patent [19]

Asada et al.

[11] Patent Number: 4,872,376
[45] Date of Patent: Oct. 10, 1989

[54] TRANSMISSION FOR A VEHICLE HAVING IMPROVED PERFORMANCE FOR SHIFTING BETWEEN SPEED STAGES

[75] Inventors: Toshiyuki Asada, Susono; Fumihiro Ushijima, Okazaki; Yasuhiko Higashiyama, Susono, all of Japan

[73] Assignee: Toyota Jidosha Kabushiki Kaisha, Japan

[21] Appl. No.: 201,454

[22] Filed: Jun. 2, 1988

[30] Foreign Application Priority Data

Jun. 4, 1987 [JP] Japan .................. 62-140660
Jul. 23, 1987 [JP] Japan .................. 62-184425
Aug. 3, 1987 [JP] Japan .................. 62-194148
Aug. 3, 1987 [JP] Japan .................. 62-194149

[51] Int. Cl.[4] .................... F16H 57/10; F16H 3/70
[52] U.S. Cl. ............................ 74/765; 74/766; 74/781 R; 74/787; 74/791
[58] Field of Search .......... 74/764, 769, 781 R, 74/782, 783, 785, 786, 787, 789, 790, 791

[56] References Cited

U.S. PATENT DOCUMENTS

| 3,946,623 | 3/1976 | Murakami et al. | 74/765 |
| 3,956,946 | 5/1976 | Murakami et al. | 74/769 X |
| 3,971,267 | 7/1976 | Murakami et al. | 74/766 X |
| 4,007,648 | 2/1977 | Bookout | 74/766 X |
| 4,038,888 | 8/1977 | Murakami et al. | 74/765 |
| 4,046,031 | 9/1977 | Ott et al. | 74/764 |
| 4,228,697 | 10/1980 | Miller | 74/764 X |
| 4,748,869 | 6/1988 | Ohtsuka | 74/765 X |

FOREIGN PATENT DOCUMENTS

| 47-36549 | 9/1972 | Japan | 74/765 |
| 52-3974 | 1/1977 | Japan | 74/765 |

*Primary Examiner*—Dwight G. Diehl
*Attorney, Agent, or Firm*—Oliff & Berridge

[57] ABSTRACT

A transmission for a vehicle wherein a single pinion type planetary gear mechanism and a double pinion type planetary gear mechanism are operatively combined by clutches and brakes in various manners to provide five or even six speed stages and a reverse stage, the overall gear ratio between the lowest speed stage and the highest speed stage thereof being relatively small in spite of the five or even six speed stages. The transmission, by further incorporating one way clutches, is generally shifted between each two adjacent speed stages by only newly putting one of the clutches or brakes into engagement or out of engagement with no need of timely related operations of other clutches or brakes.

4 Claims, 20 Drawing Sheets

|  | C1 | C2 | C3 | C4 | B1 | B2 | B3 | B4 | B5 | F1 | F2 | F3 | F4 | GEAR RATIO |
|---|---|---|---|---|---|---|---|---|---|---|---|---|---|---|
| 1st |  | ○ |  |  |  |  |  | ○ | (○) |  |  |  | ○ | 3.448 |
| 2nd |  |  | ○ | (○) | (○) |  |  | [○] |  | ○ | ○ |  |  | 2.381 |
| 3rd |  |  | ○ | (○) |  | ○ | (○) | [○] |  | ○ |  | ○ |  | 1.408 |
| 4th | ○ |  | ○ | (○) | [○] |  |  | [○] |  | ○ |  |  |  | 1.000 |
| 5th | ○ |  | [○] |  | [○] | ○ | [○] |  |  |  |  |  |  | 0.704 |
| Rev. |  | ○ |  | ○ |  |  |  |  |  |  |  |  |  | -2.381 |

$r_1 = 0.42$   $r_2 = 0.50$

○ : ENGAGED
[○] : ENGAGED BUT NULLIFIED
(○) : ENGAGED FOR ENGINE BRAKING

| F1 | C1 | C2 | C3 | C4 | B1 | B2 | B3 | B4 | B5 | F1 | F2 | F3 | F4 | GEAR RATIO |
|---|---|---|---|---|---|---|---|---|---|---|---|---|---|---|
| 1st |  |  |  | O | O | (O) |  |  |  |  |  | O |  | 3.250 |
| 2nd |  | O | (O) |  | [O] |  |  |  | (O) | O | O |  |  | 2.449 |
| 3rd |  | O | (O) |  | [O] |  | O | (O) |  | O |  |  | O | 1.444 |
| 4th | O | O | (O) |  | [O] | [O] |  |  |  | O |  |  |  | 1.000 |
| 5th | O | [O] |  |  | [O] | [O] |  |  | O |  |  |  |  | 0.693 |
| Rev. |  |  |  | O |  |  |  |  | O |  |  |  |  | 2.261 |

$r_1 = 0.69$  $r_2 = 0.52$

O : ENGAGED
[O] : ENGAGED BUT NULLIFIED
(O) : ENGAGED FOR ENGINE BRAKING

|  | C1 | C2 | C3 | B1 | B2 | B3 | GEAR RATIO |
|---|---|---|---|---|---|---|---|
| 1st | ○ |  |  | ○ |  |  | 3.381 |
| 2nd |  | ○ |  |  | ○ |  | 2.448 |
| 3rd |  | ○ |  |  |  | ○ | 1.420 |
| 4th |  | ○ | ○ |  |  |  | 1.000 |
| 5th |  |  | ○ |  |  | ○ | 0.710 |
| Rev. | ○ |  |  |  | ○ |  | -2.448 |

$r_1 = 0.42$   $r_2 = 0.50$

○ : ENGAGED

|  | C1 | C2 | C3 | B1 | B2 | B3 | F1 | F2 | GEAR RATIO |
|---|---|---|---|---|---|---|---|---|---|
| 1st | ○ |  |  | ○ |  |  |  | ○ | 3.381 |
| 2nd |  | ○ |  | [○] | (○) |  | ○ |  | 2.448 |
| 3rd |  | ○ |  | [○] |  | ○ |  |  | 1.420 |
| 4th |  | ○ | ○ | [○] |  |  |  |  | 1.000 |
| 5th |  |  | ○ | [○] |  | ○ |  |  | 0.710 |
| Rev. | ○ |  |  |  | ○ |  |  |  | -2.448 |

$r_1 = 0.42 \quad r_2 = 0.50$

○ : ENGAGED
[○] : ENGAGED BUT NULLIFIED
(○) : ENGAGED FOR ENGINE BRAKING

|      | C1 | C2 | C3 | B1 | B2 | B3 | GEAR RATIO |
|------|----|----|----|----|----|----|------------|
| 1st  | O  |    |    | O  |    |    | 3.333      |
| 2nd  |    | O  |    |    | O  |    | 2.449      |
| 3rd  |    | O  |    |    |    | O  | 1.429      |
| 4th  |    | O  | O  |    |    |    | 1.000      |
| 5th  |    |    | O  |    |    | O  | 0.704      |
| Rev. | O  |    |    |    | O  |    | 2.382      | r1 = 0.69    r2 = 0.30

O : ENGAGED

1st

2nd

5th

Rev.

TRANSMISSION FOR A VEHICLE HAVING IMPROVED PERFORMANCE FOR SHIFTING BETWEEN SPEED STAGES

BACKGROUND OF THE INVENTION

1. Field of the Invention

The present invention relates to a transmission for a vehicle, and more particularly, to a transmission of the type where a single pinion type planetary gear mechanism and a double pinion type planetary gear mechanism are combined in various manners by clutches and brakes to provide five forward speed stages and a reverse stage.

2. Description of the Prior art

When the transmission for a vehicle can provide a larger number of speed stages with correspondingly smaller gear ratios between each two adjacent speed stages, the rotational speed difference between the pump impeller and the turbine runner of the torque converter generally combined with the transmission is kept smaller during the speed shifting, and therefore, the efficiency of the torque converter, and accordingly the fuel economy of the vehicle, will be correspondingly improved, while the speed shift operation of the transmission will be more smoothly performed. Further, a wider variety of transmission ratios is also desirable for better performance of the engine.

In view of these it was a trend in the recent developments of the transmissions for vehicles to provide a larger number of speed stages.

The transmissions for vehicles designed to provide five forward speed stages and a reverse stage are proposed in Japanese Patent Publication 48-27863 (1973) (a combination of a double pinion type planetary gear mechanism and a Ravingeau type planetary gear mechanism), Japanese Patent Publication 50-32913 (1975) (a combination of three single pinion type planetary gear mechanisms), Japanese Patent Laying-open Publication 61-130649 (1986) (a combination of a single pinion type planetary gear mechanism and a double pinion type planetary gear mechanism) and Japanese Utility Model Laying-open Publications 61-117950 (1986) (also a combination of a single pinion type planetary gear mechanism and a double pinion type planetary gear mechanism).

In order for those transmissions providing five speed stages and a reverse stage to operate with good exhibition of the improved performance to be available by such a large number of transmission ratios, it is essential, as an aspect, that the changing over operation of the transmission between the speed stages, i.e. the engagement or disengagement of friction engaging means such as clutches and brakes are precisely controlled by maintaining some delicate timing relations with one another, because otherwise the transmission would be temporarily locked up by an overlapped engagement of two clutches and/or brakes thereby causing an unpleasant shock in the vehicle, or, on the contrary, the transmission would be temporarily released by an overlapped disengagement of two clutches and/or brakes thereby causing also unpleasant revving up of the engine, and, as another aspect, that the transmission is devised to provide a relatively small gear ratio between each two adjacent speed stages, because, although it is desirable that the transmission provides a larger number of speed stages, the overall gear ratio, i.e. the ratio between the lowest speed gear ratio and the highest speed gear ratio need not be increased.

SUMMARY OF THE INVENTION

Accordingly, it is a first object of the present invention to provide such a transmission for a vehicle that is changed over between speed stages only by newly putting one of a plurality of friction engaging means into engagement or out of engagement with no timely related operations of the other friction engaging means.

A second object of the present invention is to provide such a transmission for a vehicle that provides five forward speed stages and a reverse stage at a relatively low overall gear ratio in compact and inexpensive structures.

The abovementioned first object of the present invention is primarily accomplished by:

a transmission for a vehicle, comprising:
- a housing;
- a rotational input member;
- a rotational output member;
- a single pinion type planetary gear mechanism including a sun gear, a ring gear, a set of planetary pinions and a carrier;
- a double pinion type planetary gear mechanism including a sun gear, a ring gear, an inner set of planetary pinions, an outer set of planetary pinions and a carrier and arranged in a coaxial relation with said single pinion type planetary gear mechanism;
- a first, a second, a third and a fourth clutch;
- a first, a second, a third, a fourth and a fifth brake; and
- a first, a second, a third and a fourth one way clutch adapted to be engaged only when normally rotationally loaded in normal rotational direction;
- said first clutch selectively connecting said input member with said carrier of said single pinion type planetary gear mechanism and said ring gear of said double pinion type planetary gear mechanism to rotate together around a common central axis thereof, wherein said carrier of said single pinion type planetary gear mechanism and said ring gear of said double pinion type planetary gear mechanism are connected with one another to rotate together around said common central axis thereof;
- said second clutch selectively connecting said input member with said sun gear of said single pinion type planetary gear mechanism and said carrier of said double pinion type planetary gear mechanism to rotate together around a common central axis thereof, wherein said sun gear of said single pinion type planetary gear mechanism and said carrier of said double pinion type planetary gear mechanism are connected with one another to rotate together around said common central axis thereof;
- said third clutch and said first one way clutch, when normally rotationally loaded, in series, selectively connecting said input member with said sun gear of said double pinion type planetary gear mechanism to rotate together around a common central axis thereof;
- said fourth clutch selectively connecting said input member with said sun gear of said double pinion type planetary gear mechanism in parallel with said serial combination of said third clutch and said first one way clutch to rotate together around said common central axis thereof;
- said first brake and said second one way clutch, when normally rotationally loaded, in parallel, selectively braking said carrier of said single pinion type planetary gear mechanism and said ring gear of said double pinion type planetary gear mechanism relative to said housing;

said second brake and said third one way clutch, when normally rotationally loaded, in series, selectively braking said sun gear of said single pinion type planetary gear mechanism and said carrier of said double pinion type planetary gear mechanism relative to said housing;

said third brake selectively braking said sun gear of said single pinion type planetary gear mechanism and said carrier of said double pinion type planetary gear mechanism relative to said housing in parallel with said serial combination of said second brake and said third one way clutch;

said fourth brake and said fourth one way clutch, when normally rotationally loaded, in series, selectively braking said sun gear of said double pinion type planetary gear mechanism relative to said housing;

said fifth brake selectively braking said sun gear of said double pinion type planetary gear mechanism relative to said housing in parallel with said serial combination of said fourth brake and said fourth one way clutch;

said output member being connected with said ring gear of said single pinion type planetary gear mechanism to rotate together around a common central axis thereof, or by:

a transmission for a vehicle, comprising:
a housing;
a rotational input member;
a rotational output member;
a single pinion type planetary gear mechanism including a sun gear, a ring gear, a set of planetary pinions and a carrier;
a double pinion type planetary gear mechanism including a sun gear, a ring, an inner set of planetary pinions, an outer set of planetary pinions and a carrier, and arranged in a coaxial relation with said single pinion type planetary gear mechanism;
a first, a second, a third and a fourth clutch;
a first, a second, a third, a fourth and a fifth brake; and
a first, a second, a third and a fourth one way clutch adapted to be engaged only when normally rotationally loaded in normal rotational direction;

said first clutch selectively connecting said input member with said ring gear of said single pinion type planetary gear mechanism and said ring gear of said double pinion type planetary gear mechanism to rotate together around a common central axis thereof, wherein said ring gear of said single pinion type planetary gear mechanism and said ring gear of said double pinion type planetary gear mechanism are connected with one another to rotate together around said common central axis thereof;

said second clutch and said first one way clutch, when normally rotationally loaded, in series, selectively connecting said input member with said sun gear of said single pinion type planetary gear mechanism and said carrier of said double pinion type planetary gear mechanism to rotate together around a common central axis thereof, wherein said sun gear of said single pinion type planetary gear mechanism and said carrier of said double pinion type planetary gear mechanism are connected with one another to rotate together around said common central axis thereof;

said third clutch selectively connecting said input member with said sun gear of said single pinion type planetary gear mechanism and said carrier of said double pinion type planetary gear mechanism in parallel with said serial combination of said second clutch and said first one way clutch to rotate together around said common central axis thereof;

said fourth clutch selectively connecting said input member with said sun gear of said double pinion type planetary gear mechanism to rotate together around a common central axis thereof;

said first brake and said third one way clutch, when normally rotationally loaded, in series, selectively braking said sun gear of said single pinion type planetary gear mechanism and said carrier of said double pinion type planetary gear mechanism relative to said housing;

said second brake selectively braking said sun gear of said single pinion type planetary gear mechanism and said carrier of said double pinion type planetary gear mechanism relative to said housing in parallel with said serial combination of said first brake and said third one way clutch;

said third brake and said fourth one way clutch, when normally rotationally loaded, in series, selectively braking said sun gear of said double pinion type planetary gear mechanism relative to said housing;

said fourth brake selectively braking said sun gear of said double pinion type planetary gear mechanism relative to said housing in parallel with said serial combination of said third brake and said fourth one way clutch;

said fifth brake and said second one way clutch, when normally rotationally loaded, in parallel, selectively braking said ring gear of said single pinion type planetary gear mechanism and said ring gear of said double pinion type planetary gear mechanism relative to said housing;

said output member being connected with said carrier of said single pinion type planetary gear mechanism to rotate together around a common central axis thereof.

Further, the abovementioned second object of the present invention is primarily accomplished by:
a transmission for a vehicle, comprising:
a housing;
a rotational input member;
a rotational output member;
a single pinion type planetary gear mechanism including a sun gear, a ring gear, a set of planetary pinions and a carrier;
a double pinion type planetary gear mechanism including a sun gear, a ring gear, an inner set of planetary pinions, an outer set of planetary pinions and a carrier, and arranged in a coaxial relation with said single pinion type planetary gear mechanism;
a first, a second and a third clutch; and
a first, a second and a third brake;

said first clutch selectively connecting said input member with said sun gear of said single pinion type planetary gear mechanism and said sun gear of said double pinion type planetary gear mechanism to rotate together around a common central axis thereof, wherein said sun gear of said single pinion type planetary gear mechanism and said sun gear of said double pinion type planetary gear mechanism are connected with one another to rotate together around said common central axis thereof;

said second clutch selectively connecting said input member with said ring gear of said single pinion type planetary gear mechanism and said carrier of said double pinion type planetary gear mechanism to rotate together around a common central axis thereof, wherein said ring gear of said single pinion type planetary gear mechanism and said carrier of said double pinion type planetary gear mechanism are connected with one another to rotate together around said common central axis thereof;

said third clutch selectively connecting said input member with said ring gear of said double pinion type planetary gear mechanism to rotate together around a common central axis thereof;

said first brake selectively braking said ring gear of said single pinion type planetary gear mechanism and said carrier of said double pinion type planetary gear mechanism relative to said housing;

said second brake selectively braking said ring gear of said double pinion type planetary gear mechanism relative to said housing;

said third brake selectively braking said sun gear of said single pinion type planetary gear mechanism and said sun gear of said double pinion type planetary gear mechanism relative to said housing;

said output member being connected with said carrier of said single pinion type planetary gear mechanism to rotate together around a common central axis thereof, or by:

a transmission for a vehicle, comprising:
a housing;
a rotational input member;
a rotational output member;
a single pinion type planetary gear mechanism including a sun gear, a ring gear, a set of planetary pinions and a carrier;
a double pinion type planetary gear mechanism including a sun gear, a ring gear, an inner set of planetary pinions, an outer set of planetary pinions and a carrier, and arranged in a coaxial relation with said single pinion type planetary gear mechanism;
a first, a second and a third clutch; and
a first, a second and a third brake;

said first clutch selectively connecting said input member with said sun gear of said double pinion type planetary gear mechanism to rotate together around a common central axis thereof;

said second clutch selectively connecting said input member with said sun gear of said single pinion type planetary gear mechanism and said carrier of said double pinion type planetary gear mechanism to rotate together around a common central axis thereof, wherein said sun gear of said single pinion type planetary gear mechanism and said carrier of said double pinion type planetary gear mechanism are connected with one another to rotate together around said common central axis thereof;

said third clutch selectively connecting said input member with said ring gear of said single pinion type planetary gear mechanism to rotate together around a common central axis thereof;

said first brake selectively braking said sun gear of said single pinion type planetary gear mechanism and said carrier of said double pinion type planetary gear mechanism relative to said housing;

said second brake selectively braking said ring gear of said single pinion type planetary gear mechanism relative to said housing;

said third brake selectively braking said sun gear of said double pinion type planetary gear mechanism relative to said housing;

said output member being connected with said carrier of said single pinion type planetary gear mechanism and said ring gear of said double pinion type planetary gear mechanism to rotate together around said common central axis thereof.

Further, the abovementioned second object of the present invention may also be accomplished by:
a transmission for a vehicle, comprising:
a housing;
a rotational input member;
a rotational output member;
a single pinion type planetary gear mechanism including a sun gear, a ring gear, a set of planetary pinions and a carrier;
a double pinion type planetary gear mechanism including a sun gear, a ring gear, an inner set of planetary pinions, an outer set of planetary pinions and a carrier, and arranged in a coaxial relation with said single pinion type planetary gear mechanism;
a first, a second and a third clutch;
a first, a second and a third brake; and
a first and a second one way clutch adapted to be engaged only when normally rotationally loaded in normal rotational direction;

said first clutch selectively connecting said input member with said sun gear of said single pinion type planetary gear mechanism and said sun gear of said double pinion type planetary gear mechanism to rotate together around a common central axis thereof, wherein said sun gear of said single pinion type planetary gear mechanism and said sun gear of said double pinion type planetary gear mechanism are connected with one another to rotate together around said common central axis thereof;

said second clutch selectively connecting said input member with said ring gear of said single pinion type planetary gear mechanism and said carrier of said double pinion type planetary gear mechanism to rotate together around a common central axis thereof, wherein said ring gear of said single pinion type planetary gear mechanism and said carrier of said double pinion type planetary gear mechanism are connected with one another to rotate together around said common central axis thereof;

said third clutch selectively connecting said input member with said ring gear of said double pinion type planetary gear mechanism to rotate together around a common central axis thereof;

said first brake and said second one way clutch, when normally rotationally loaded, in series, selectively braking said ring gear of said single pinion type planetary gear mechanism and said carrier of said double pinion type planetary gear mechanism relative to said housing;

said second brake and said first one way clutch, when normally rotationally loaded, in parallel, selectively braking said ring gear of said double pinion type planetary gear mechanism relative to said housing;

said third brake selectively braking said sun gear of said single pinion type planetary gear mechanism and said sun gear of said double pinion type planetary gear mechanism relative to said housing;

said output member being connected with said carrier of said single pinion type planetary gear mechanism to rotate together around a common central axis thereof.

BRIEF DESCRIPTION OF THE DRAWINGS

In the accompanying drawings.

DESCRIPTION OF THE PREFERRED EMBODIMENTS

The present invention will now be described in detail with reference to the attached drawings and in terms of embodiments.

First Embodiment

Figures 1, 2:
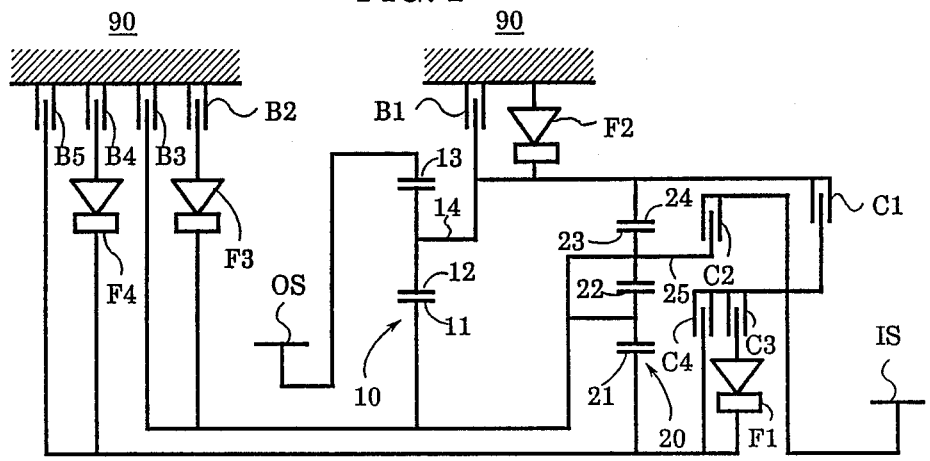
FIG. 1 a schematic view of a first embodiment of the transmission according to the present invention.
FIG. 2 is a table showing the operating conditions of the clutches, the brakes and the one way clutches included in the transmission shown in FIG. 1 at various shift stages thereof.
Figure 3:
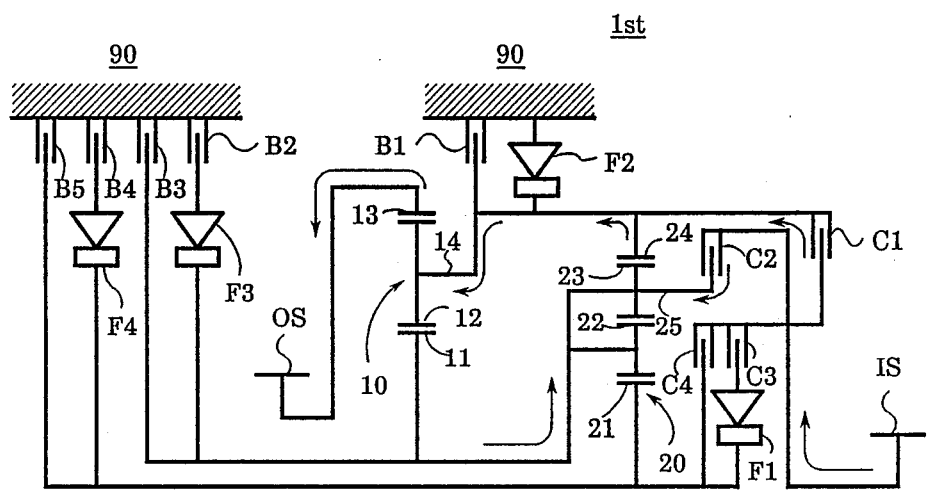
FIGS. 3-8 are the same view as FIG. 1, illustrating flows of rotational power at various shift stages of the transmission shown in FIG. 1.
Figure 4:
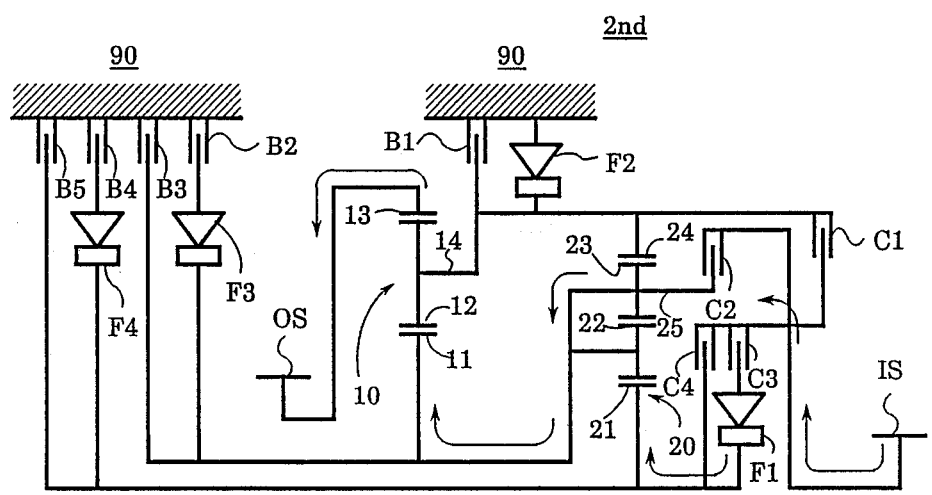
Figure 5:
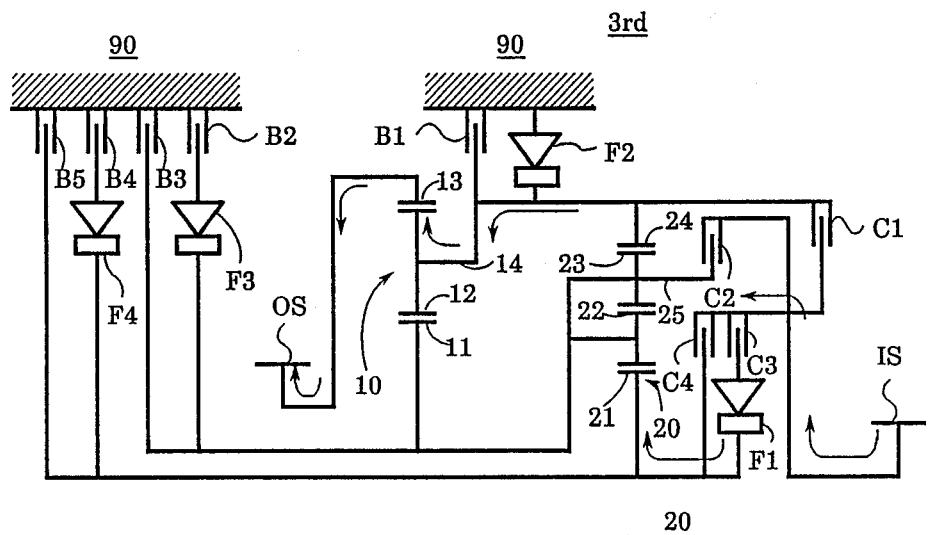
Figure 6:
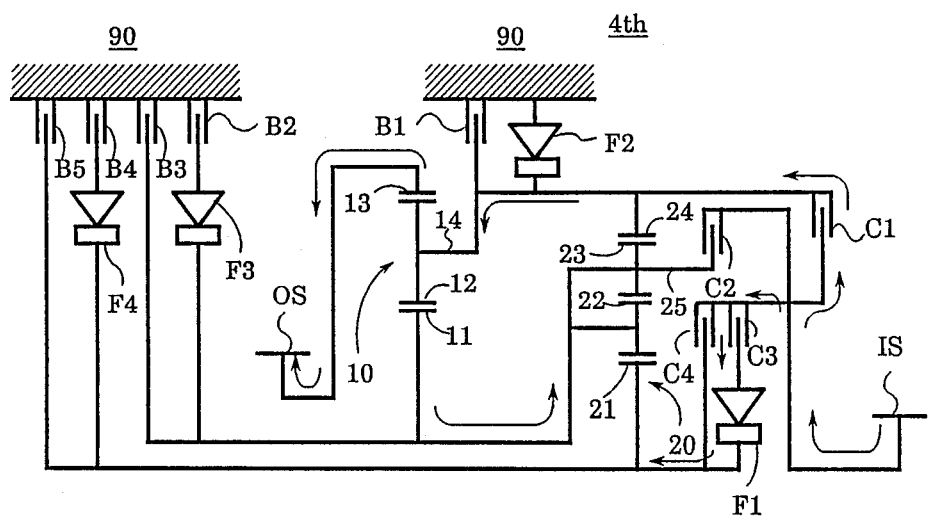
Figure 7:
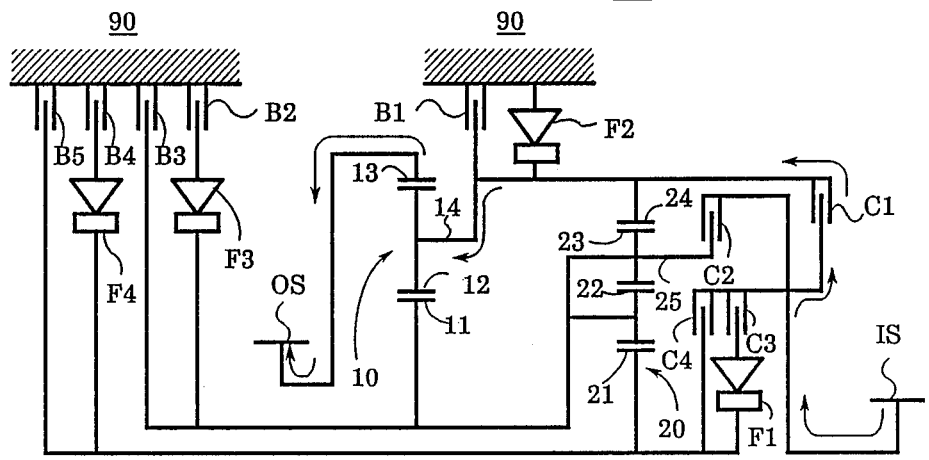
Figure 8:
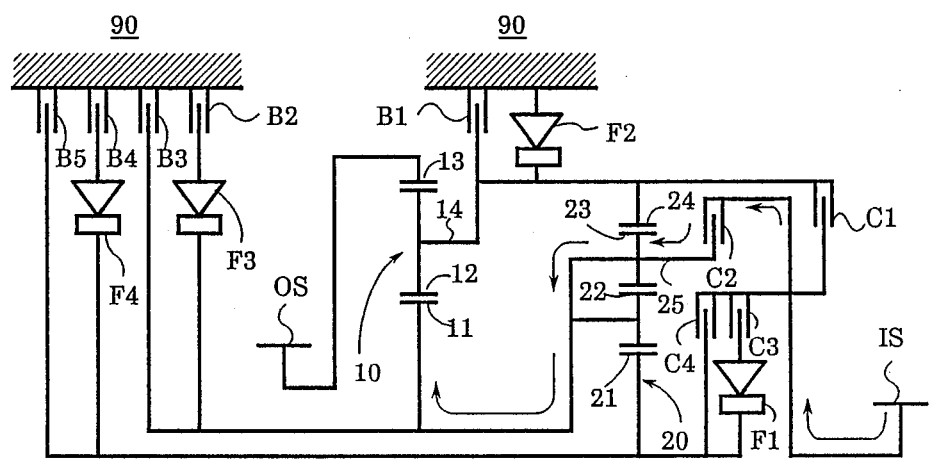

First referring to FIG. 1 showing the first embodiment of the transmission according to the present invention in a schematic illustration, the transmission is constructed as follows:

The transmission comprises:
a housing 90, only a part of which is shown;
a rotational input member IS;
a rotational output member OS;
a single pinion type planetary gear mechanism generally designated by 10, including a sun gear 11, a ring gear 13, a set of planetary pinions 12 and a carrier 14;

a double pinion type planetary gear mechanism generally designated by 20, including a sun gear 21, a ring gear 24, an inner set of planetary pinions 22, an outer set of planetary pinions 23 and a carrier 25, and arranged in a coaxial relation with said single pinion type planetary gear mechanism 10;

a first, a second, a third and a fourth clutch C1, C2, C3 and C4;

a first, a second, a third, a fourth and a fifth brake B1, B2, B3, B4 and B5; and a first, a second, a third and a fourth one way clutch F1, F2, F3 and F4 adapted to be engaged only when normally rotationally loaded in normal rotational direction;

said first clutch C1 selectively connecting said input member IS with said carrier 14 of said single pinion type planetary gear mechanism and said ring gear 24 of said double pinion type planetary gear mechanism to rotate together around a common central axis thereof (not shown), wherein said carrier 14 of said single pinion type planetary gear mechanism and said ring gear 24 of said double pinion type planetary gear mechanism are connected with one another to rotate together around said common central axis thereof;

said second clutch C2 selectively connecting said input member IS with said sun gear 11 of said single pinion type planetary gear mechanism and said carrier 25 of said double pinion type planetary gear mechanism to rotate together around a common central axis thereof (not shown), wherein said sun gear 11 of said single pinion type planetary gear mechanism and said carrier 25 of said double pinion type planetary gear mechanism are connected with one another to rotate together around said common central axis thereof;

said third clutch C3 and said first one way clutch F1, when normally rotationally loaded, in series, selectively connecting said input member IS with said sun gear 21 of said double pinion type planetary gear mechanism to rotate together around a common central axis thereof (not shown);

said fourth clutch C4 selectively connecting said input member IS with said sun gear 21 of said double pinion type planetary gear mechanism in parallel with said serial combination of said third clutch C3 and said first one way clutch F1 to rotate together around said common central axis thereof;

said first brake B1 and said second one way clutch F2, when normally rotationally loaded, in parallel, selectively braking said carrier 14 of said single pinion type planetary gear mechanism and said ring gear 24 of said double pinion type planetary gear mechanism relative to said housing 90;

said second brake B2 and said third one way clutch F3, when normally rotationally loaded, in series, selectively braking said sun gear 11 of said single pinion type planetary gear mechanism and said carrier 25 of said double pinion type planetary gear mechanism relative to said housing 90;

said third brake B3 selectively braking said sun gear 11 of said single pinion type planetary gear mechanism and said carrier 25 of said double pinion type planetary gear mechanism relative to said housing 90 in parallel with said serial combination of said second brake B2 and said third one way clutch F3;

said fourth brake B4 and said fourth one way clutch F4, when normally rotationally loaded, in series, selectively braking said sun gear 21 of said double pinion type planetary gear mechanism relative to said housing 90;

said fifth brake B5 selectively braking said sun gear 21 of said double pinion type planetary gear mechanism relative to said housing 90 in parallel with said serial combination of said fourth brake B4 and said fourth one way clutch F4;

said output member OS being connected with said ring gear 13 of said single pinion type planetary gear mechanism to rotate together around a common central axis thereof (not shown).

In the transmission shown in FIG. 1, the ratio ($r_1$) of the number of teeth of the sun gear 11 to that of the ring gear 13 of said single pinion type planetary gear mechanism 10 may be generally 0.42, while the ratio ($r_2$) of the number of teeth of the sun gear 21 to that of the ring gear 24 of said double pinion type planetary gear mechanism 20 may be generally 0.50.

The operating conditions of said clutches, brakes and one way clutches included in the transmission shown in FIG. 1 for providing various shift stages are shown in the table of FIG. 2.

As shown in this table, said second clutch C2 and said fourth brake B4 are operatively engaged with said fourth one way clutch F4 being automatically engaged to provide a first and lowest speed stage (1st); said third clutch C3 and said fourth brake B4 are operatively engaged with said first and second one way clutches F1, F2 being automatically engaged while said fourth brake B4 is automatically nullified by said fourth one way clutch F4 to provide a second speed stage (2nd) next higher to said first speed stage; said third clutch C3 and said second and fourth brakes B2, B4 are operatively engaged with said first and third one way clutches F1, F3 being automatically engaged while said fourth brake B4 is automatically nullified by said fourth one way clutch F4 to provide a third speed stage (3rd) next higher to said second speed stage; said first and third clutches C1, C3 and said second and fourth brakes B2, B4 are operatively engaged with said first one way clutch F1 being automatically engaged while said second and fourth brakes B2, B4 are automatically nullified by said third and fourth one way clutches F3, F4, respectively, to provide a fourth speed stage (4th) next higher to said third speed stage; said first and third clutches C1, C3 and said second, third and fourth brakes B2, B3, B4 are operatively engaged while said third clutch C3 and said second and fourth brakes B2, B4 are automatically nullified by said first, third and fourth one way clutches F1, F3, F4, respectively, to provide a fifth speed stage (5th) next higher to said fourth speed stage; and said second clutch C2 and said first brake B1 are operatively engaged to provide a reverse stage (Rev).

From the above operation it will be appreciated that, except the shifting between said first and second speed stages, the shifting between each two adjacent forward speed stages is accomplished by only one of said clutches or brakes being newly put into engagement or out of engagement with no need of timely related operation of other clutches or brakes. Said first speed stage having such a large reduction gear ratio as described hereinunder will not be needed for normal start up of the vehicle. Therefore, the transmission may be so arranged that said first speed stage is not used for normal driving of the vehicle, and that said first speed stage is used only when very high driving torque is particularly required.

Said fifth brake B5 is further operatively engaged to provide said first speed stage (1st) in engine braking condition.

Said fourth clutch C4 and said first brake B1 are further operatively engaged to provide said second speed stage (2nd) in engine braking condition.

Said fourth clutch C4 and said third brake B3 are further operatively engaged to provide said third speed stage (3rd) in engine braking condition.

Said fourth clutch C4 is further operatively engaged to provide said fourth speed stage (4th) in engine braking condition.

In said 5th speed stage engine braking is always available.

From FIGS. 1 and 2 the operations of the transmission at various shift stages will be obvious for one of ordinary skill in the art. However, for the convenience of review, the flows of rotational power in the transmission during the operations thereof at said 1st, 2nd, 3rd, 4th, 5th and reverse stages are illustrated in FIGS. 3–8, respectively.

Further, as will be obvious from FIGS. 1–8 for one of ordinary skill in the art, the speed change ratios at said 1st, 2nd, 3rd, 4th and 5th speed stages and said reverse stage are as follows:

1st speed stage: $1/(1-r_2-r_1 \cdot r_2)$
2nd speed stage: $(1-r_2)/(r_1 \cdot r_2)$
3rd speed stage: $1/(r_2 \cdot (1+r_1))$
4th speed stage: 1
5th speed stage: $1/(1+r_1)$
reverse stage: $-1/r_1$ In the table of FIG. 2 the values of the speed change ratios at the respective stages are calculated based upon $r_1=0.42$ and $r_2=0.50$.

Second Embodiment

Figures 9, 10:
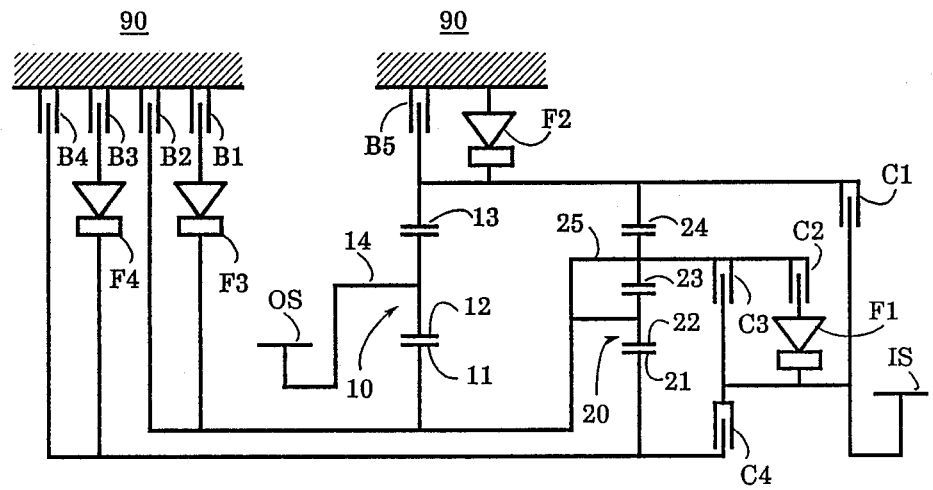
FIG. 9 a schematic view of a second embodiment of the transmission according to the present invention.
FIG. 10 is a table showing the operating conditions of the clutches, the brakes and the one way clutches included in the transmission shown in FIG. 9 at various shift stages thereof.
Figure 11:
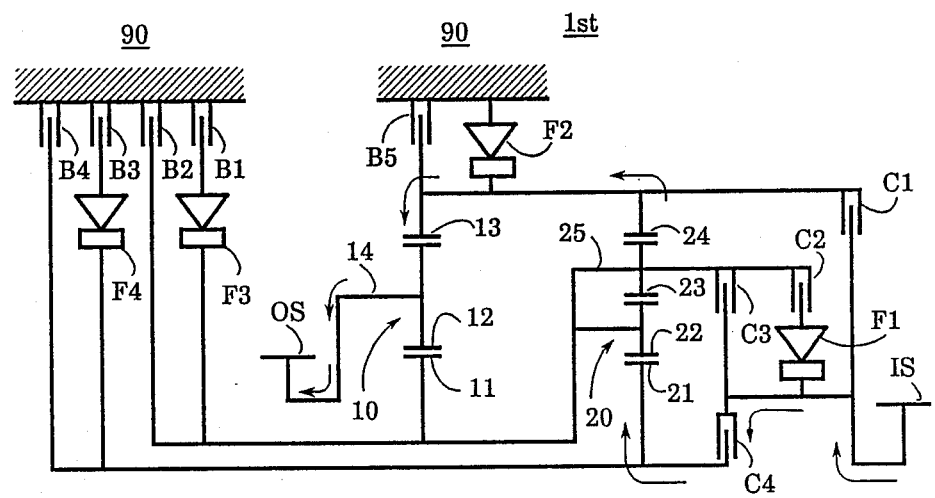
FIGS. 11-16 are the same view as FIG. 9, illustrating flows of rotational power at various shift stages of the transmission shown in FIG. 9.
Figure 12:
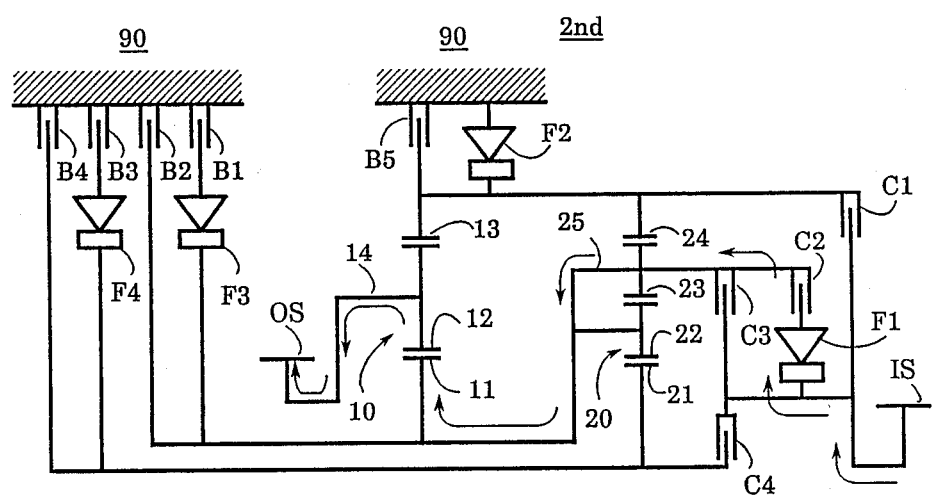
Figure 13:
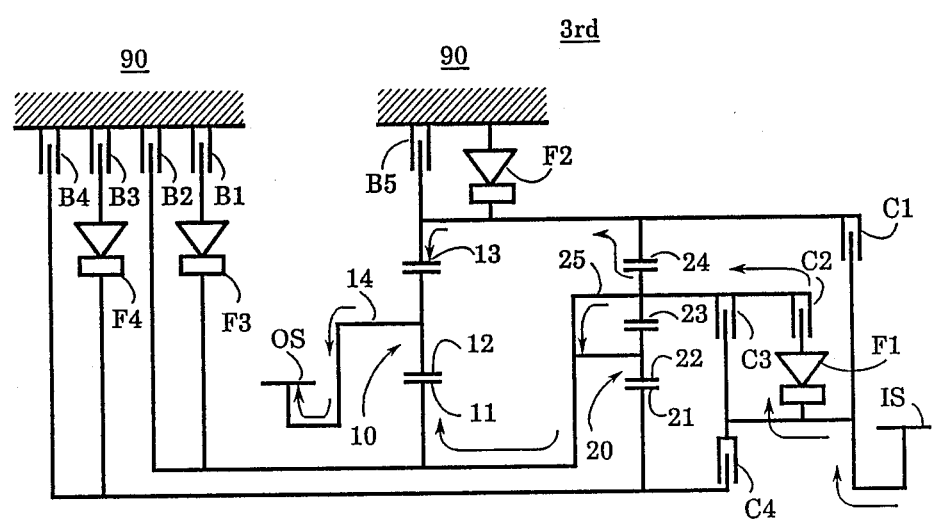
Figure 14:
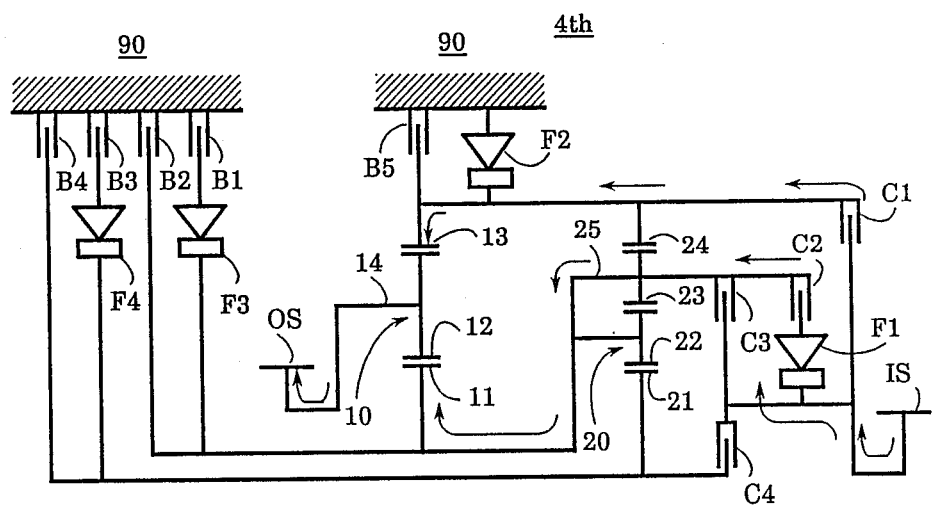
Figure 15:
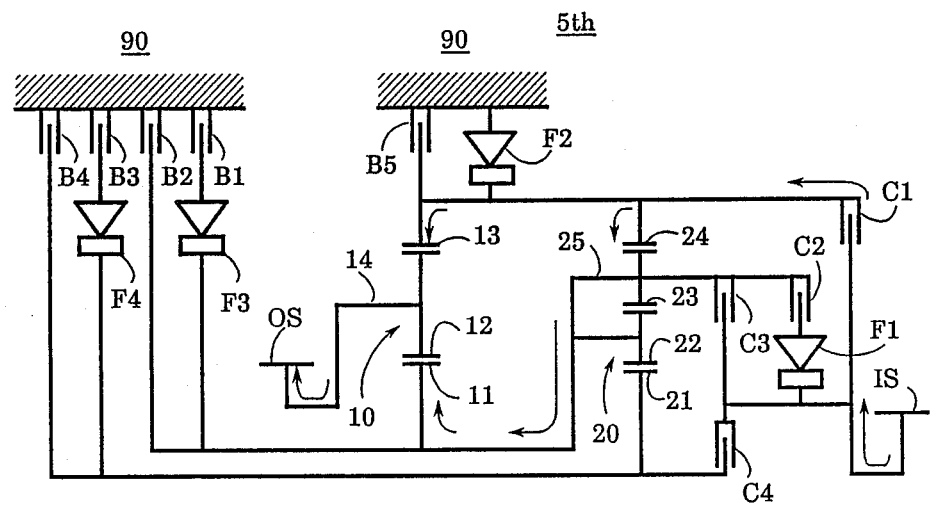
Figure 16:
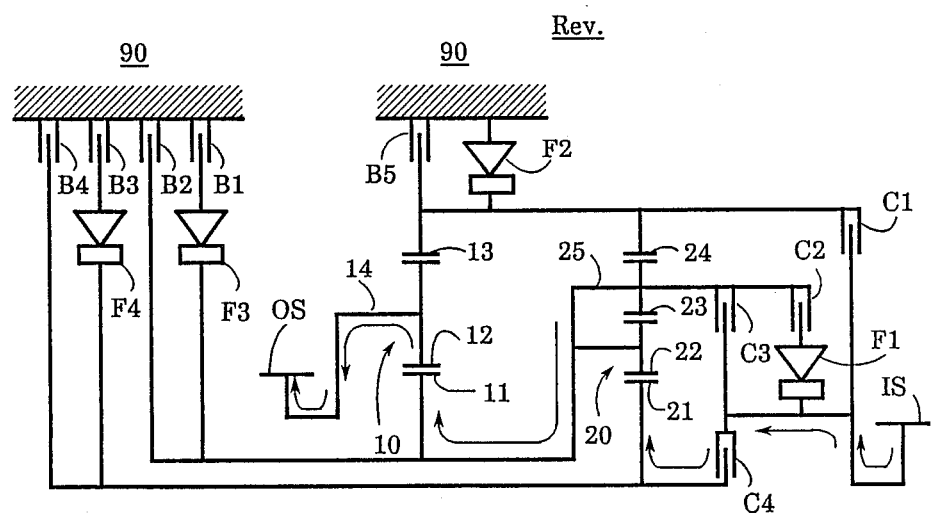

Next, referring to FIG. 9 showing the second embodiment of the transmission according to the present invention in a schematic illustration, the transmission is constructed as follows:

The transmission comprises:

a housing 90, only a part of which is shown;

a rotational input member IS;

a rotational output member OS;

a single pinion type planetary gear mechanism generally designated by 10, including a sun gear 11, a ring gear 13, a set of planetary pinions 12 and a carrier 14;

a double pinion type planetary gear mechanism generally designated by 20, including a sun gear 21, a ring 24, an inner set of planetary pinions 22, an outer set of planetary pinions 23 and a carrier 25, and arranged in a coaxial relation with said single pinion type planetary gear mechanism 10;

a first, a second, a third and a fourth clutch C1, C2, C3 and C4;

a first, a second, a third, a fourth and a fifth brake B1, B2, B3, B4 and B5; and a first, a second, a third and a fourth one way clutch F1, F2, F3 and F4 adapted to be engaged only when normally rotationally loaded in normal rotational direction;

said first clutch C1 selectively connecting said input member IS with said ring gear 13 of said single pinion type planetary gear mechanism and said ring gear 24 of said double pinion type planetary gear mechanism to rotate together around a common central axis thereof (not shown), wherein said ring gear 13 of said single pinion type planetary gear mechanism and said ring gear 24 of said double pinion type planetary gear mechanism are connected with one another to rotate together around said common central axis thereof;

said second clutch C2 and said first one way clutch F1, when normally rotationally loaded, in series, selectively connecting said input member IS with said sun gear 11 of said single pinion type planetary gear mechanism and said carrier 25 of said double pinion type planetary gear mechanism to rotate together around a common central axis thereof (not shown), wherein said sun gear 11 of said single pinion type planetary gear mechanism and said carrier 25 of said double pinion type planetary gear mechanism are connected with one another to rotate together around said common central axis thereof;

said third clutch C3 selectively connecting said input member IS with said sun gear 11 of said single pinion type planetary gear mechanism and said carrier 25 of said double pinion type planetary gear mechanism in parallel with said serial combination of said second clutch C2 and said first one way clutch F1 to rotate together around said common central axis thereof;

said fourth clutch C4 selectively connecting said input member IS with said sun gear 21 of said double pinion type planetary gear mechanism to rotate together around a common central axis thereof (not shown);

said first brake B1 and said third one way clutch F3, when normally rotationally loaded, in series, selectively braking said sun gear 11 of said single pinion type planetary gear mechanism and said carrier 25 of said double pinion type planetary gear mechanism relative to said housing 90;

said second brake B2 selectively braking said sun gear 11 of said single pinion type planetary gear mechanism and said carrier 25 of said double pinion type planetary gear mechanism relative to said housing 90 in parallel with said serial combination of said first brake B1 and said third one way clutch F3;

said third brake B3 and said fourth one way clutch F4, when normally rotationally loaded, in series, selectively braking said sun gear 21 of said double pinion type planetary gear mechanism relative to said housing 90;

said fourth brake B4 selectively braking said sun gear 21 of said double pinion type planetary gear mechanism relative to said housing 90 in parallel with said serial combination of said third brake B3 and said fourth one way clutch F4;

said fifth brake B5 and said second one way clutch F2, when normally rotationally loaded, in parallel, selectively braking said ring gear 13 of said single pinion type planetary gear mechanism and said ring gear 24 of said double pinion type planetary gear mechanism relative to said housing 90;

said output member OS being connected with said carrier 14 of said single pinion type planetary gear mechanism to rotate together around a common central axis thereof (not shown).

The ratio ($r_1$) of the number of teeth of the sun gear 11 to that of the ring gear 13 of said single pinion type planetary gear mechanism 10 may be generally 0.69, while the ratio ($r_2$) of the number of teeth of the sun gear 21 to that of the ring gear 13 of said double pinion type planetary gear mechanism 20 may be generally 0.52.

The operating conditions of said clutches, brakes and one way clutches included in the transmission shown in FIG. 9 for providing various shift stages are shown in the table of FIG. 10.

As shown in this table, said fourth clutch C4 and said first brake B1 are operatively engaged with said third one way clutch F3 being automatically engaged to provide a first and lowest speed stage (1st); said second clutch C2 and said first brake B1 are operatively engaged with said first and second one way clutches F1, F2 being automatically engaged while said first brake B1 is automatically nullified by said third one way clutch F3 to provide a second speed stage (2nd) next higher to said first speed stage; said second clutch C2 and said first and third brakes B1, B3 are operatively engaged with said first and fourth one way clutches F1, F4 being automatically engaged while said first brake B1 is automatically nullified by said third one way clutch F3 to provide a third speed stage (3rd) next higher to said second speed stage; said first and second clutches F1, F2 and said first and third brakes B1, B3 are operatively engaged with said first one way clutch F1 being automatically engaged while said first and third brakes B1, B3 are automatically nullified by said third and fourth one way clutches F3, F4, respectively, to provide a fourth speed stage (4th) next higher to said third speed stage; said first and second clutches C1, C2 and said first, third and fourth brakes B1, B3, B4 are operatively engaged while said second clutch C2 and said first and third brakes B1, B3 are automatically nullified by said first, third and fourth one way clutches F1, F3, F4, respectively, to provide a fifth speed stage (5th) next higher to said fourth speed stage; and said fourth clutch C4 and said fifth brake B5 are operatively engaged to provide a reverse stage (Rev).

As will be appreciated from the above operation, also in the transmission of this second embodiment the speed shifting between each two adjacent speed stages is, except between said first and second speed stages, accomplished by only one of said clutches or brakes being newly put into engagement or out of engagement with no need of timely related operation of the other clutches or brakes. Again, said first speed stage having a very large speed reduction ratio may be made a special speed stage to be occasionally used when very high driving torque is required for the vehicle.

Said second brake B2 is further operatively engaged to provide said first speed stage (1st) in engine braking condition.

Said third clutch C3 and said fifth brake B5 are further operatively engaged to provide said second speed stage (2nd) in engine braking condition.

Said third clutch C3 and said fourth brake B4 are further operatively engaged to provide said third speed stage (3rd) in engine braking condition.

Said third clutch C3 is further operatively engaged to provide said fourth speed stage (4th) in engine braking condition.

In said 5th speed stage engine braking is always available.

From FIGS. 9 and 10 the operations of the transmission at various shift stages will be obvious for one of ordinary skill in the art. However, for the convenience of review, the flows of rotational power in the transmission during the operations thereof at said 1st, 2nd, 3rd, 4th, 5th and reverse stages are illustrated in FIGS. 11–16, respectively.

Further, as will be obvious from FIGS. 9–16 for one of ordinary skill in the art, the speed change ratios at said 1st, 2nd, 3rd, 4th and 5th speed stages and said reverse stage are as follows:

1st speed stage: $(1+r_1)/r_2$
2nd speed stage: $(1+r_1)/r_1$
3rd speed stage: $(1+r_1)/(1-r_2+r_1)$
4th speed stage: 1
5th speed stage: $(1-r_2+r_1-r_1 \cdot r_2)/(1-r_2+r_1)$
reverse stage: $-(1-r_2+r_1-r_1 \cdot r_2)/r_1 \cdot r_2$ In the table of FIG. 10 the values of the speed change ratios at the respective stages are calculated based upon $r_1=0.69$ and $r_2=0.52$.

Third Embodiment

Figures 17, 18:
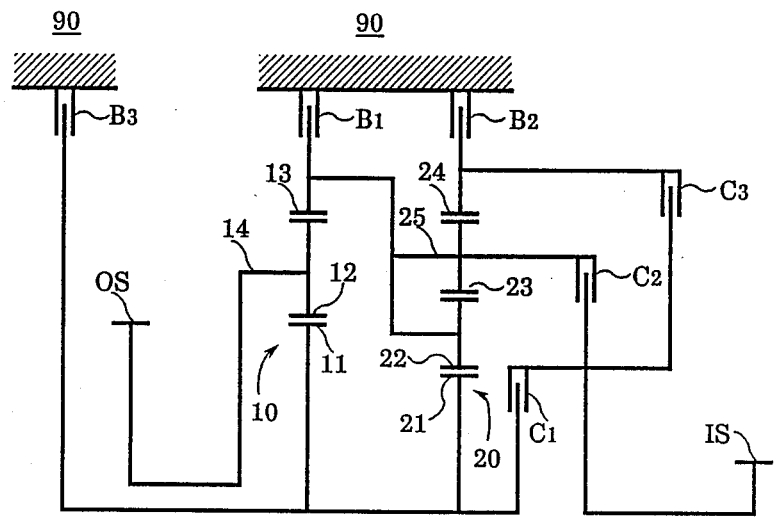
FIG. 17 a schematic view of a third embodiment of the transmission according to the present invention.
FIG. 18 is a table showing the operating conditions of the clutches and the brakes included in the transmission shown in FIG. 17 at various shift stages thereof.

Next, referring to FIG. 17 showing the third embodiment of the transmission according to the present invention in a schematic illustration, the transmission is constructed as follows:

The transmission comprises:
a housing 90, only a part of which is shown;
a rotational input member IS;
a rotational output member OS;
a single pinion type planetary gear mechanism generally designated by 10, including a sun gear 11, a ring gear 13, a set of planetary pinions 12 and a carrier 14;
a double pinion type planetary gear mechanism generally designated by 20, including a sun gear 21, a ring gear 24, an inner set of planetary pinions 22, an outer set of planetary pinions 23 and a carrier 25, and arranged in a coaxial relation with said single pinion type planetary gear mechanism 10;
a first, a second and a third clutch C1, C2 and C3; and
a first, a second and a third brake B1, B2 and B3;
said first clutch C1 selectively connecting said input member IS with said sun gear 11 of said single pinion type planetary gear mechanism and said sun gear 21 of said double pinion type planetary gear mechanism to rotate together around a common central axis thereof (not shown), wherein said sun gear 11 of said single pinion type planetary gear mechanism and said sun gear 21 of said double pinion type planetary gear mechanism are connected with one another to rotate together around said common central axis thereof;
said second clutch C2 selectively connecting said input member IS with said ring gear 13 of said single pinion type planetary gear mechanism and said carrier 25 of said double pinion type planetary gear mechanism to rotate together around a common central axis thereof (not shown), wherein said ring gear 13 of said single pinion type planetary gear mechanism and said carrier 25 of said double pinion type planetary gear mechanism are connected with one another to rotate together around said common central axis thereof;
said third clutch C3 selectively connecting said input member IS with said ring gear 24 of said double pinion type planetary gear mechanism to rotate together around a common central axis thereof (not shown);
said first brake B1 selectively braking said ring gear 13 of said single pinion type planetary gear mechanism and said carrier 25 of said double pinion type planetary gear mechanism relative to said housing 90;
said second brake B2 selectively braking said ring gear 24 of said double pinion type planetary gear mechanism relative to said housing 90;
said third brake B3 selectively braking said sun gear 11 of said single pinion type planetary gear mechanism and said sun gear 21 of said double pinion type planetary gear mechanism relative to said housing 90;
said output member OS being connected with said carrier 14 of said single pinion type planetary gear mechanism to rotate together around a common central axis thereof (not shown).

The operating conditions of said clutches and brakes included in the transmission shown in FIG. 17 for providing various shift stages are shown in the table of FIG. 18.

Figures 19, 20:
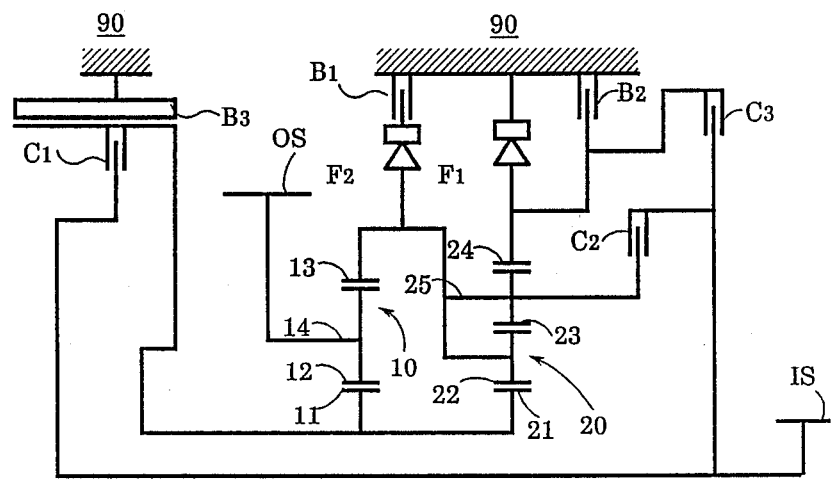
FIG. 19 is a schematic view of a modification of the third embodiment shown in FIG. 17, wherein two one way clutches are further incorporated.
FIG. 20 is a table showing the operating conditions of the clutches, the brakes and the one way clutches included in the transmission shown in FIG. 19 at various shift stages thereof.
Figure 21:
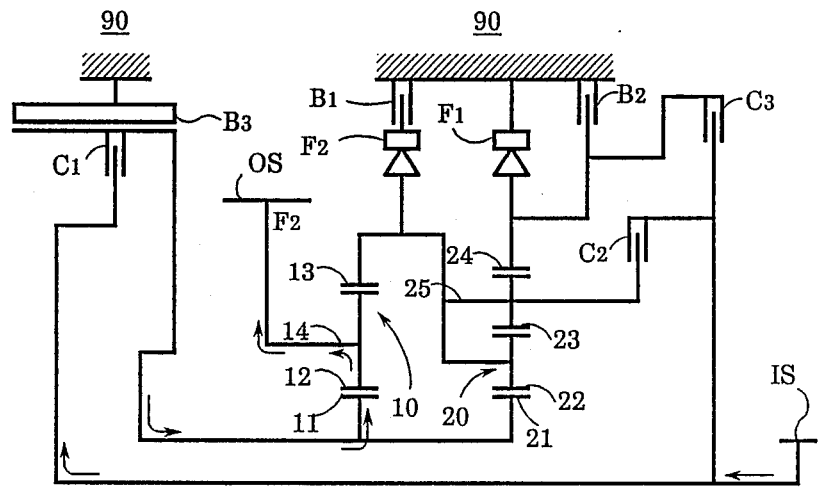
FIGS. 21-27 are the same view as FIG. 19, illustrating flows of rotational power at various shift stages of the transmission shown in FIG. 19.
Figure 22:
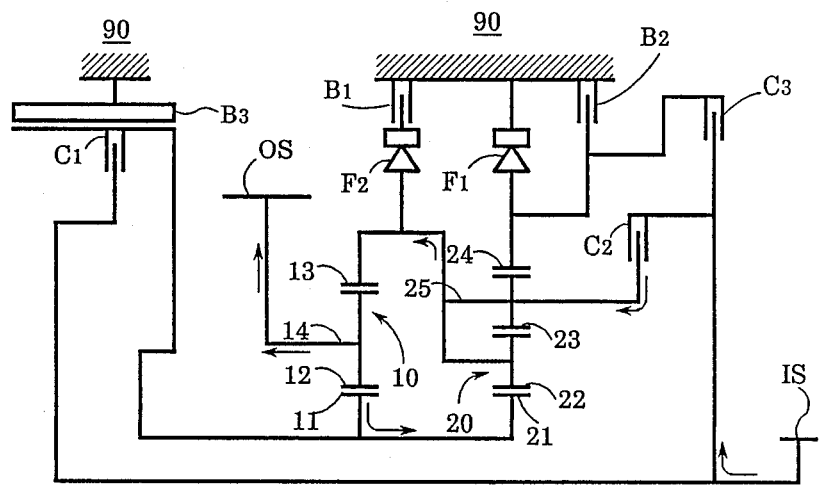
Figure 23:
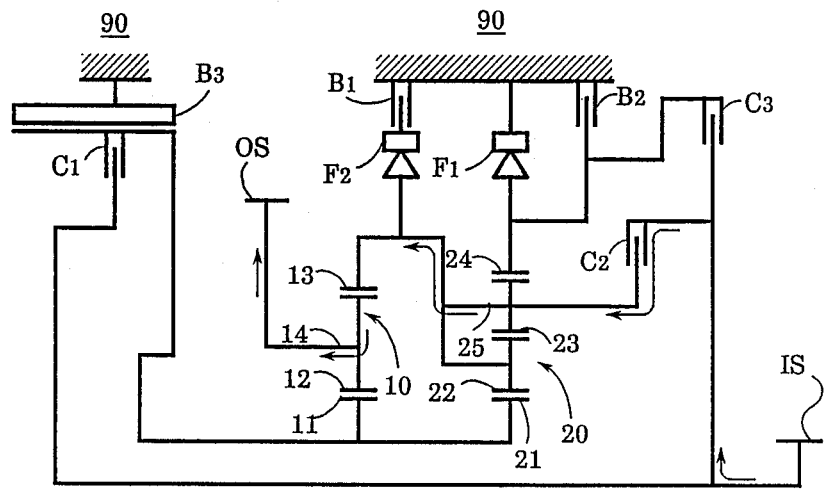
Figure 24:
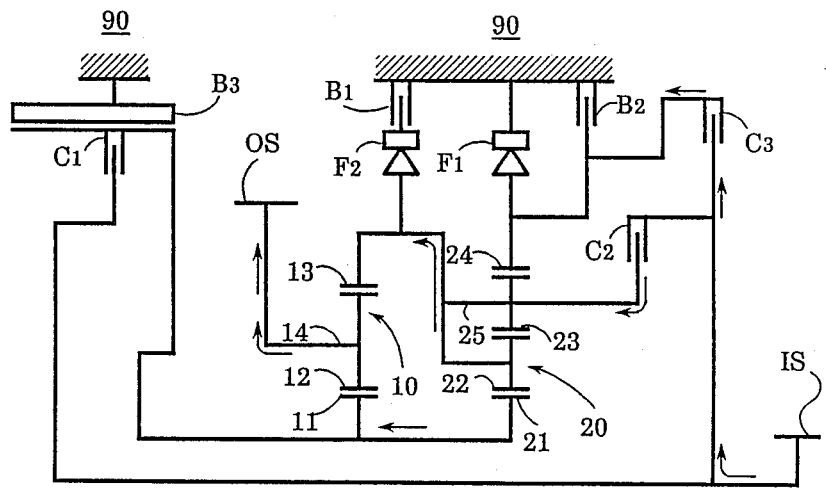
Figure 25:
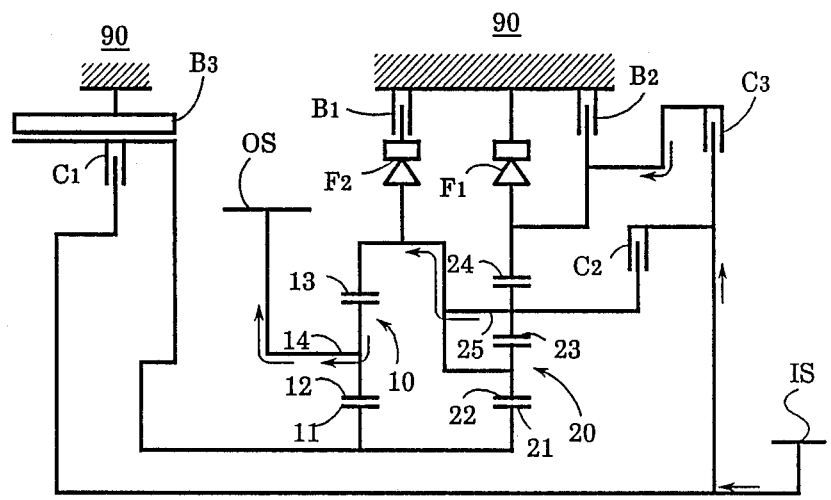
Figure 26:
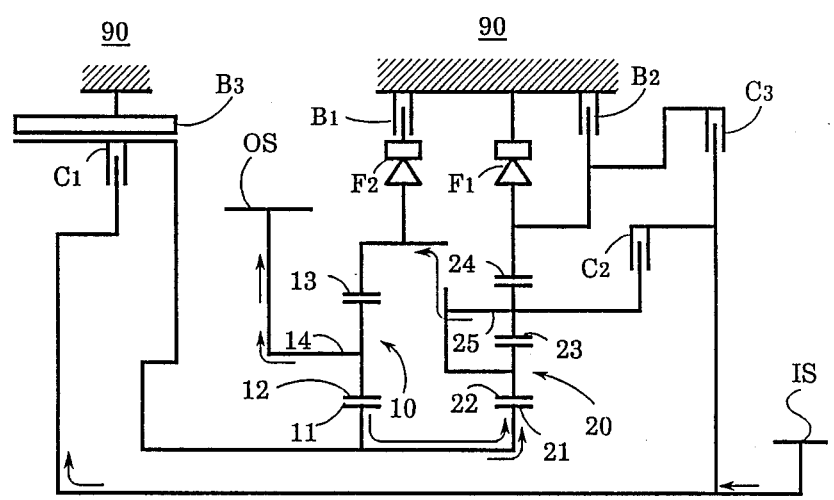

Further, a modification of the third embodiment shown in FIG. 17 is shown in FIG. 19. This modification is additionally to incorporate two one way clutches into the transmission shown in FIG. 17. This modified transmission is constructed as follows:

The transmission comprises:
a housing 90, only a part of which is shown;
a rotational input member IS;
a rotational output member OS;
a single pinion type planetary gear mechanism generally designated by 10, including a sun gear 11, a ring gear 13, a set of planetary pinions 12 and a carrier 14;
a double pinion type planetary gear mechanism generally designated by 20, including a sun gear 21, a ring gear 24, an inner set of planetary pinions 22, an outer set of planetary pinions 23 and a carrier 25, and arranged in a coaxial relation with said single pinion type planetary gear mechanism 10;
a first, a second and a third clutch C1, C2 and C3;
a first, a second and a third brake B1, B2 and B3; and
a first and a second one way clutch F1, F2 adapted to be engaged only when normally rotationally loaded in normal rotational direction;
said first clutch C1 selectively connecting said input member IS with said sun gear 11 of said single pinion type planetary gear mechanism and said sun gear 21 of said double pinion type planetary gear mechanism to rotate together around a common central axis thereof (not shown), wherein said sun gear 11 of said single pinion type planetary gear mechanism and said sun gear 21 of said double pinion type planetary gear mechanism are connected with one another to rotate together around said common central axis thereof;
said second clutch C2 selectively connecting said input member IS with said ring gear 13 of said single pinion type planetary gear mechanism and said carrier 25 of said double pinion type planetary gear mechanism to rotate together around a common central axis thereof (not shown), wherein said ring gear 13 of said single pinion type planetary gear mechanism and said carrier 25 of said double pinion type planetary gear mechanism are connected with one another to rotate together around said common central axis thereof;

said third clutch C3 selectively connecting said input member IS with said ring gear 24 of said double pinion type planetary gear mechanism to rotate together around a common central axis thereof (not shown);

said first brake B1 and said second one way clutch F2, when normally rotationally loaded, in series, selectively braking said ring gear 13 of said single pinion type planetary gear mechanism and said carrier 25 of said double pinion type planetary gear mechanism relative to said housing 90;

said second brake B2 and said first one way clutch F1, when normally rotationally loaded, in parallel, selectively braking said ring gear 24 of said double pinion type planetary gear mechanism relative to said housing 90;

said third brake B3 selectively braking said sun gear 11 of said single pinion type planetary gear mechanism and said sun gear 21 of said double pinion type planetary gear mechanism relative to said housing 90;

said output member OS being connected with said carrier 14 of said single pinion type planetary gear mechanism to rotate together around a common central axis thereof (not shown).

Figure 37:
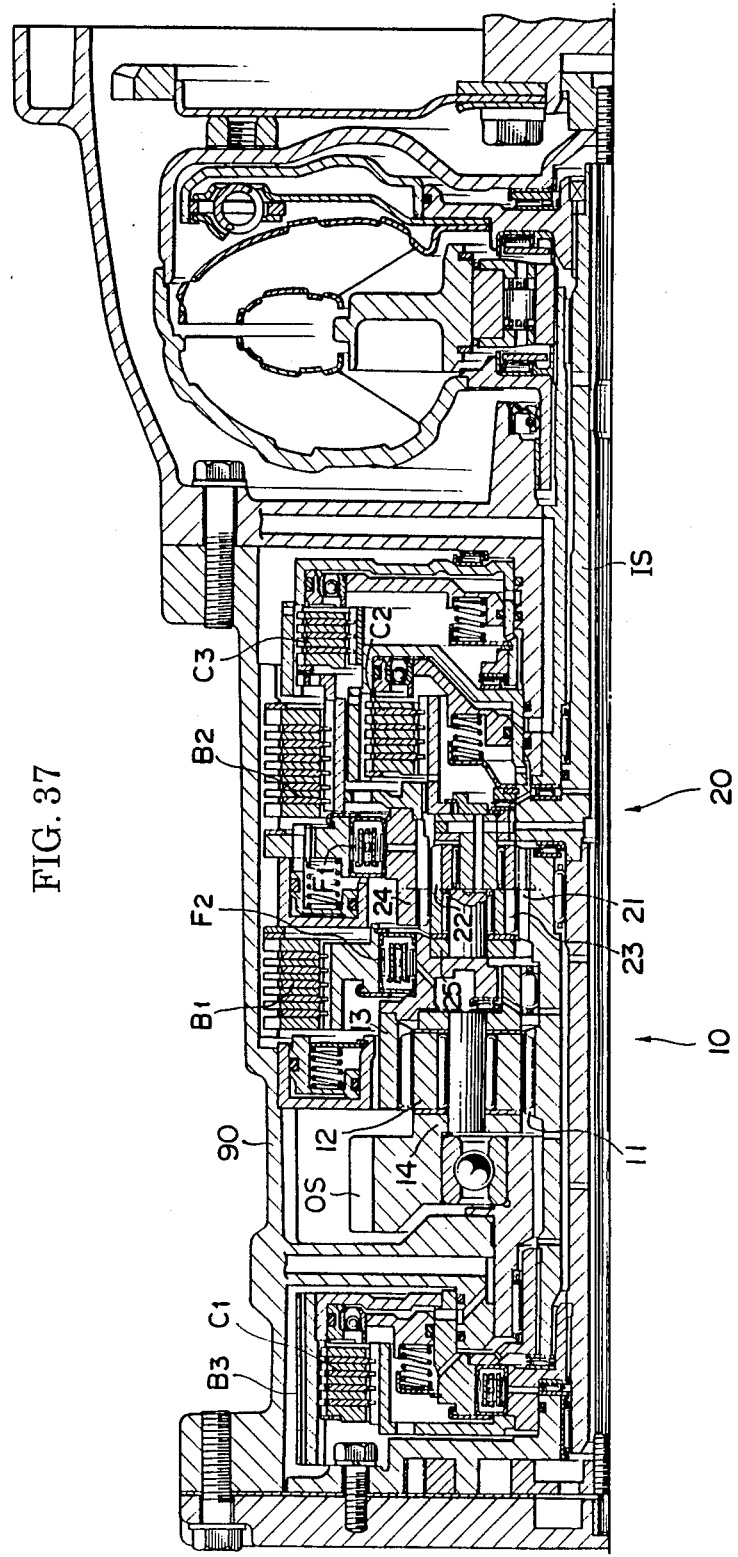
FIG. 37 is a longitudinally sectional view in more detail of the transmission shown in FIGS. 19-27.

The transmission shown in the schematic form in FIG. 19 is shown in more detail in FIG. 37 in a longitudinally sectional view. In FIG. 37 the portions corresponding to those shown in FIG. 19 are designated by the same reference numerals as in FIG. 19.

The operating conditions of said clutches, brakes and one way clutches included in the transmission shown in FIG. 19 for providing various shift stages are shown in the table of FIG. 20.

From FIGS. 17–18 and FIGS. 19–20 the operations of the respective transmissions at various shift stages will be obvious for one of ordinary skill in the art. However, the flows of rotational power in the transmission during the operations thereof at said 1st, 2nd, 3rd, 4th, 5th and reverse stages will be more clear from the illustrations of FIGS. 21–26 which are shown with respect to the transmission shown in FIG. 19, wherein two one way clutches are incorporated.

As shown in the table of FIG. 18, in the transmission shown in FIG. 17, said first clutch C1 and said first brake B1 are operatively engaged to provide a first and lowest speed stage (1st); said second clutch C2 is operatively engaged to provide a second speed stage (2nd) next higher to said first speed stage; said second clutch C2 and said third brake B3 are operatively engaged to provide a third speed stage (3rd) next higher to said second speed stage; said second and third clutches C2, C3 are operatively engaged to provide a fourth speed stage (4th) next higher to said third speed stage; said third clutch C3 and said third brake B3 are operatively engaged to provide a fifth speed stage (5th) next higher to said fourth speed stage; and said first clutch C1 and said second brake B2 are operatively engaged to provide a reverse stage.

As shown in the table of FIG. 20, in the transmission shown in FIG. 19, said first clutch C1 and said first brake B1 are operatively engaged with said second one way clutch F2 being automatically engaged to provide a first and lowest speed stage (1st); said second clutch C2 is operatively engaged with said first one way clutch being automatically engaged while said first brake B1 being automatically nullified by said second one way clutch F2 to provide a second speed stage (2nd) next higher to said first speed stage; said second clutch C2 and said third brake B3 are operatively engaged while said first brake B1 being automatically nullified by said second one way clutch F2 to provide a third speed stage (3rd) next higher to said second speed stage; said second and third clutches C2, C3 are operatively engaged while said first brake B1 being automatically nullified by said second one way clutch F2 to provide a fourth speed stage (4th) next higher to said third speed stage; said third clutch C3 and said third brake B3 are operatively engaged while said first brake B1 being automatically nullified by said second one way clutch F2 to provide a fifth speed stage (5th) next higher to said fourth speed stage; and said first clutch C1 and said second brake B2 are operatively engaged to provide a reverse stage.

In both of the transmissions shown in FIGS. 17 and 19 the second brake B2 is further operatively engaged to provide said second speed stage in engine braking condition.

In both of the transmissions shown in FIGS. 17 and 19, the ratio ($r_1$) of the number of teeth of the sun gear 11 to that of the ring gear 13 of said single pinion type planetary gear mechanism may be generally 0.42, while the ratio ($r_2$) of the number of teeth of the sun gear 21 to that of the ring gear 24 of said double pinion type planetary gear mechanism may be generally 0.50.

Further, as will be obvious from FIGS. 17–26 for one of ordinary skill in the art, in both of the transmissions the speed change ratios at said 1st, 2nd, 3rd, 4th and 5th speed stages and said reverse stage are as follows:

1st speed stage: $(1+r_1)/r_1$
2nd speed stage: $r_2(1+r_1)/(r_2-r_1+r_1 \cdot r_2)$
3rd speed stage: $1+r_1$
4th speed stage: 1
5th speed stage: $(1-r_2)(1+r_1)$
reverse stage: $-(1-r_2)(1+r_1)/(r_2-r_1+r_1 \cdot r_2)$ In the tables of FIGS. 18 and 20 the values of the speed change ratios at the respective stages are calculated based upon $r_1=0.42$ and $r_2=0.50$.

Figure 27:
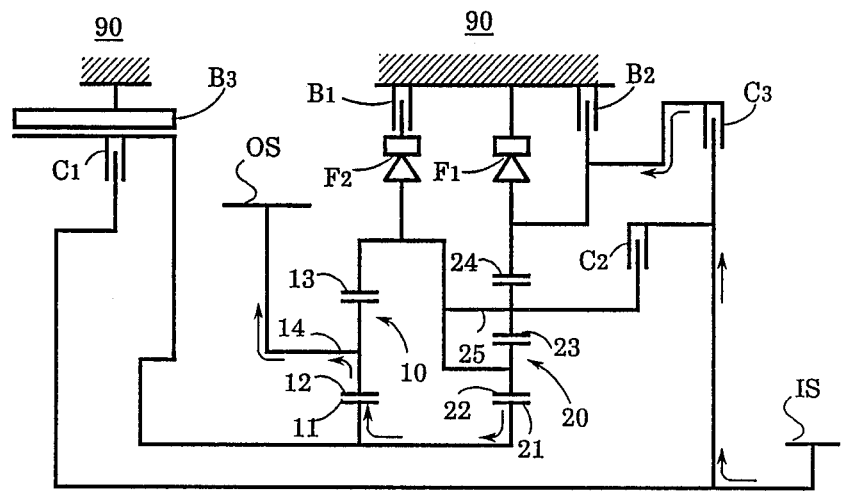

Further, the transmission of this third embodiment and the modification thereof can provide one more additional speed stage having speed change ratio $(r_2+r_1 \cdot r_2)/r_1$ by said third clutch C3 and said first brake B1 being engaged (with said second one way clutch F2 being engaged as normally rotationally loaded, when provided). The flow of rotational power in this condition is shown in FIG. 27 with respect to the modified transmission. Therefore, when $r_1$ is 0.42 and $r_2$ is 0.50, the speed change ratio at this stage is 1.690. This stage may be interposed between the 2nd speed stage and the 3rd speed stage so that the transmission provides six forward speed stages and a reverse stage. Or, alternatively, the 3rd speed stage in the table of FIG. 18 or 20 may be replaced by this additional stage so that a series of speed change ratios are 3.381, 2.448, 1.690, 1.000 and 0.710.

From the above operation, it will be appreciated that the transmission of this third embodiment and the modification thereof provide five or even six forward speed stages within a relatively small overall gear ratio such as 4.762 (=3.381/0.710).

Fourth Embodiment

Figures 28, 29:
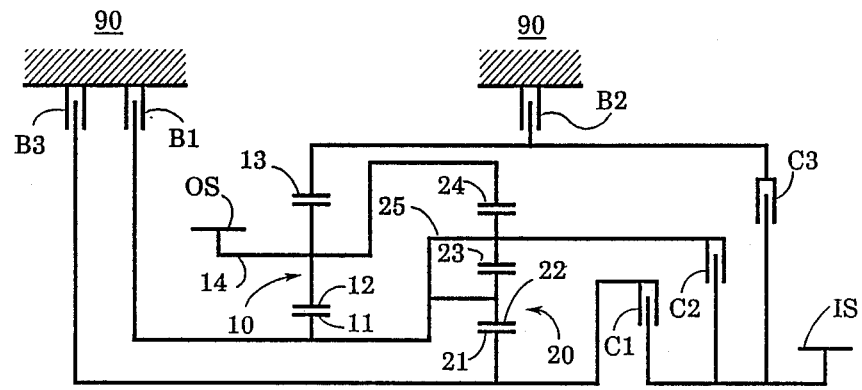
FIG. 28 a schematic view of a fourth embodiment of the transmission according to the present invention.
FIG. 29 is a table showing the operating conditions of the clutches and the brakes included in the transmission shown in FIG. 28 at various shift stages thereof.
Figure 30:
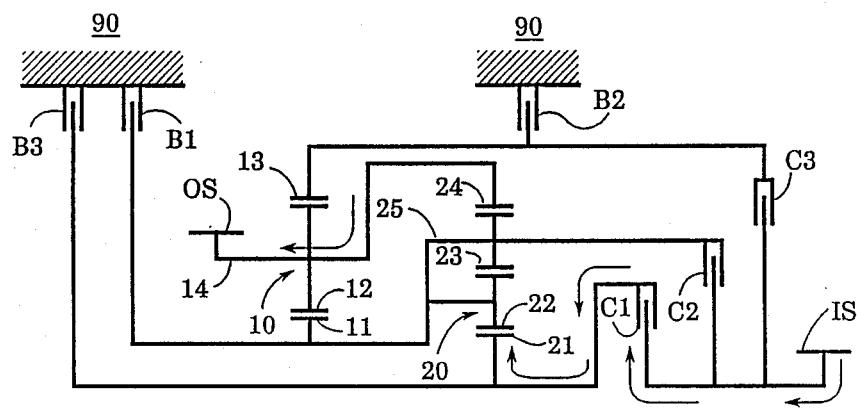
FIGS. 30-36 are the same view as FIG. 28, illustrating flows of rotational power at various shift stages of the transmission shown in FIG. 28.
Figure 31:
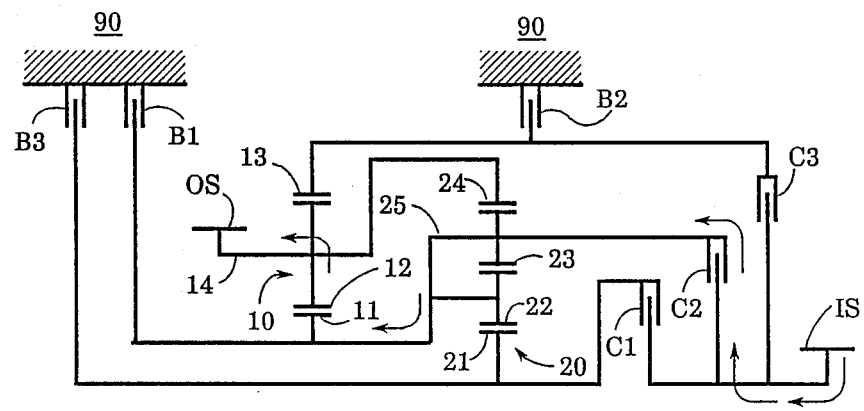
Figure 32:
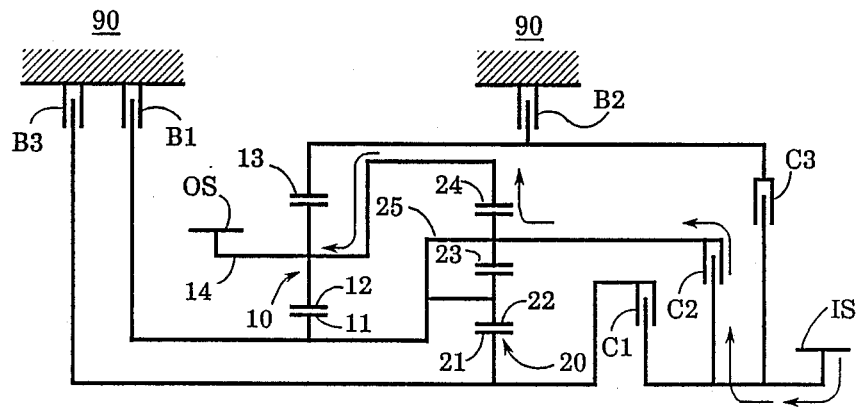
Figure 33:
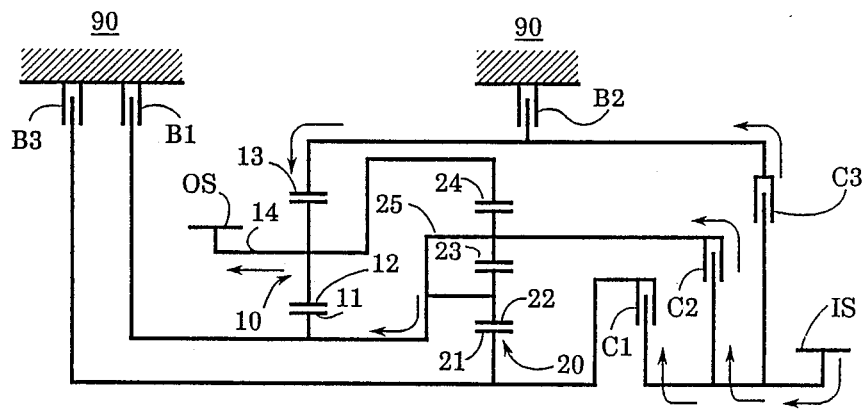
Figure 34:
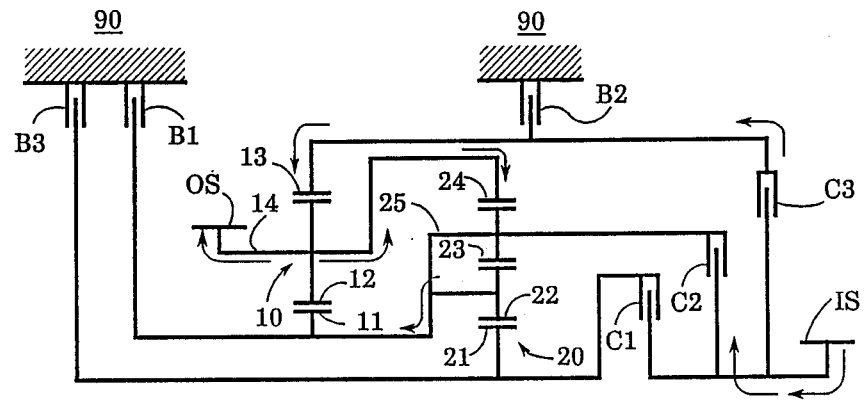
Figure 35:
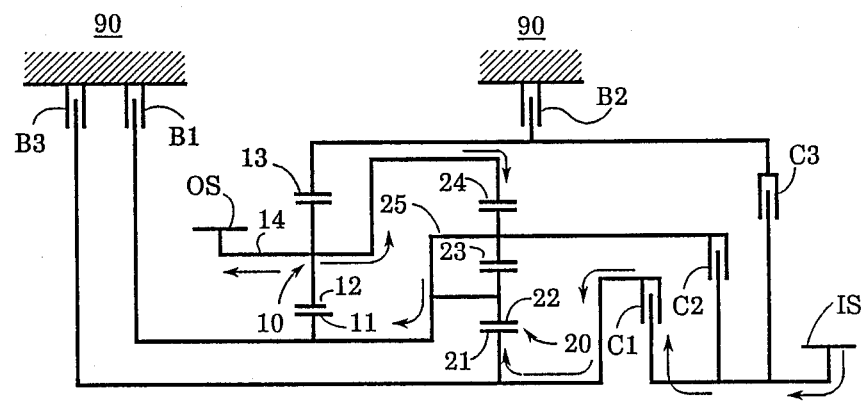

Next, referring to FIG. 28 showing the fourth embodiment of the transmission according to the present invention in a schematic illustration, the transmission is constructed as follows:

The transmission comprises:
a housing 90;
a rotational input member IS;
a rotational output member OS;
a single pinion type planetary gear mechanism generally designated by 10 and including a sun gear 11, a ring gear 13, a set of planetary pinions 12 and a carrier 14;
a double pinion type planetary gear mechanism generally designated by 20 and including a sun gear 21, a ring gear 24, an inner set of planetary pinions 22, an outer set of planetary pinions 23 and a carrier 25, and arranged in a coaxial relation with said single pinion type planetary gear mechanism 10;
a first, a second and a third clutch C1, C2 and C3; and
a first, a second and a third brake B1, B2 and B3;
said first clutch C1 selectively connecting said input member IS with said sun gear 21 of said double pinion type planetary gear mechanism to rotate together around a common central axis thereof (not shown);
said second clutch C2 selectively connecting said input member IS with said sun gear 11 of said single pinion type planetary gear mechanism and said carrier 25 of said double pinion type planetary gear mechanism to rotate together around a common central axis thereof (not shown), wherein said sun gear 11 of said single pinion type planetary gear mechanism and said carrier 25 of said double pinion type planetary gear mechanism are connected with one another to rotate together around said common central axis thereof;
said third clutch C3 selectively connecting said input member IS with said ring gear 13 of said single pinion type planetary gear mechanism to rotate together around a common central axis thereof (not shown);
said first brake B1 selectively braking said sun gear 11 of said single pinion type planetary gear mechanism and said carrier 25 of said double pinion type planetary gear mechanism relative to said housing 90;
said second brake B2 selectively braking said ring gear 13 of said single pinion type planetary gear mechanism relative to said housing 90;
said third brake B3 selectively braking said sun gear 21 of said double pinion type planetary gear mechanism relative to said housing 90;
said output member OS being connected with said carrier 14 of said single pinion type planetary gear mechanism and said ring gear 24 of said double pinion type planetary gear mechanism to rotate together around said common central axis thereof.

In the structure shown in FIG. 28 no one way clutch is yet incorporated. However, it will not be difficult to further incorporate one or more one way clutches in this structure in order automatically to nullify certain clutches and/or brakes so that no delicate time related overlapping between engagement and disengagement of two clutches and/or brakes are required during shifting between two stages.

In the transmission shown in FIG. 28, the ratio ($r_1$) of the number of teeth of the sun gear 11 to that of the ring gear 13 of said single pinion type planetary gear mechanism 10 may be generally 0.69, while the ratio ($r_2$) of the number of teeth of the sun gear 21 to that of the ring gear 24 of said double pinion type planetary gear mechanism 20 may be generally 0.30.

The operating conditions of said clutches and brakes included in the transmission shown in FIG. 28 for providing various shift stages are shown in the table of FIG. 29.

As shown in this table, said first clutch C1 and said first brake B1 are operatively engaged to provide a first and lowest speed stage (1st); said second clutch C2 and said second brake B2 are operatively engaged to provide a second speed stage (2nd) next higher to said first speed stage; said second clutch C2 and said third brake B3 are operatively engaged to provide a third speed stage (3rd) next higher to said second speed stage; said second and third clutches C2, C3 are operatively engaged to provide a fourth speed stage (4th) next higher to said third speed stage; said third clutch C3 and said third brake B3 are operatively engaged to provide a fifth speed stage (5th) next higher to said fourth speed stage; and said first clutch C1 and said second brake B2 are operatively engaged to provide a reverse stage (Rev).

From FIGS. 28 and 29 the operations of the transmission at various shift stages will be obvious for one of ordinary skill in the art. However, for the convenience of review, the flows of rotational power in the transmission during the operations thereof at said 1st, 2nd, 3rd, 4th, 5th and reverse stages are illustrated in FIGS. 30-35, respectively.

Further, as will be obvious from FIGS. 30-35 for one of ordinary skill in the art, the speed change ratios at said 1st, 2nd, 3rd, 4th and 5th speed stages and said reverse stage are as follows:

1st speed stage: $1/r_2$
2nd speed stage: $(1+r_1)/r_1$
3rd speed stage: $1/(1-r_2)$
4th speed stage: 1
5th speed stage: $(1-r_2-r_1 \cdot r_2)/(1-r_2)$
reverse stage: $-(1-r_2-r_1 \cdot r_2)/r_1 \cdot r_2$ In the table of FIG. 29 the values of the speed change ratios at respective stages are calculated based upon $r_1=0.69$ and $r_2=0.30$.

Figure 36:
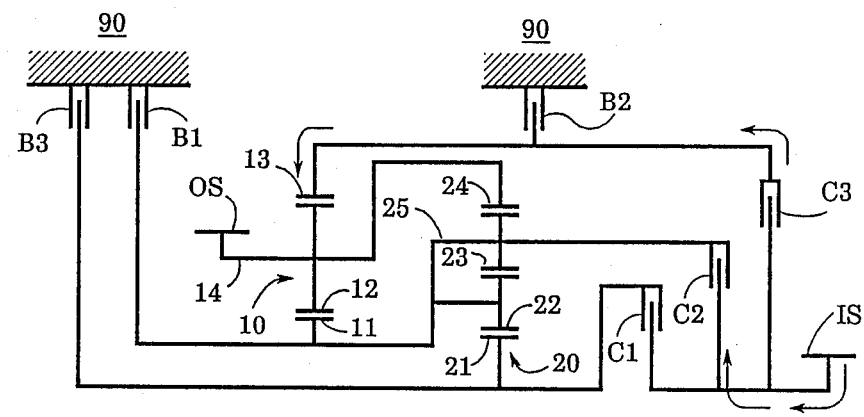

Further, the transmission of this fourth embodiment can provide one more additional speed stage having speed change ratio $1+r_1$ by said third clutch C3 and said first brake B1 being engaged. The flow of rotational power in this condition is shown in FIG. 36. Therefore, when $r_1$ is 0.69, the speed change ratio at this stage is 1.69. This stage may be interposed between the 2nd speed stage and the 3rd speed stage so that the transmission provides six forward speed stages and a reverse stage. Or, alternatively, the 3rd speed stage in the table of FIG. 29 may be replaced by this additional stage so that a series of speed change ratios are 3.333, 2.449, 1.690, 1.000 and 0.704.

From the above operation, it will be appreciated that the transmission of this fourth embodiment provides five or even six forward speed stages within a relatively small overall gear ratio such as 4.734 (=3.333/0.704).

Although the invention has been described and illustrated in the form of some preferred embodiments thereof, it will be understood by those skilled in the art that various modifications are possible with these embodiments without departing from the spirit of the present invention.

We claim:

1. A transmission for a vehicle, comprising:
a housing;
a rotational input member;
a rotational output member;
a single pinion type planetary gear mechanism including a sun gear, a ring gear, a set of planetary pinions and a carrier;
a double pinion type planetary gear mechanism including a sun gear, a ring gear, an inner set of planetary pinions, an outer set of planetary pinions and a carrier, and arranged in a coaxial relation with said single pinion type planetary gear mechanism;
a first, a second and a third clutch;
a first, a second and a third brake; and
a first and a second one way clutch adapted to be engaged only when normally rotationally loaded in normal rotational direction;
said first clutch selectively connecting said input member with said sun gear of said single pinion type planetary gear mechanism and said sun gear of said double pinion type planetary gear mechanism to rotate together around a common central axis thereof, wherein said sun gear of said single pinion type planetary gear mechanism and said sun gear of said double pinion type planetary gear mechanism are connected with one another to rotate together around said common central axis thereof;
said second clutch selectively connecting said input member with said ring gear of said single pinion type planetary gear mechanism and said carrier of said double pinion type planetary gear mechanism to rotate together around a common central axis thereof, wherein said ring gear of said single pinion type planetary gear mechanism and said carrier of said double pinion type planetary gear mechanism are connected with one another to rotate together around said common central axis thereof;
said third clutch selectively connecting said input member with said ring gear of said double pinion type planetary gear mechanism to rotate together around a common central axis thereof;
said first brake and said second one way clutch, when normally rotationally loaded, in series, selectively braking said ring gear of said single pinion type planetary gear mechanism and said carrier of said double pinion type planetary gear mechanism relative to said housing;
said second brake and said first one way clutch, when normally rotationally loaded, in parallel, selectively braking said ring gear of said double pinion type planetary gear mechanism relative to said housing;
said third brake selectively braking said sun gear of said single pinion type planetary gear mechanism and said sun gear of said double pinion type planetary gear mechanism relative to said housing;
said output member being connected with said carrier of said single pinion type planetary gear mechanism to rotate together around a common central axis thereof.

2. A transmission according to claim 1, wherein the ratio of the number of teeth of the sun gear to that of the ring gear of said single pinion type planetary gear mechanism is generally 0.42, while the ratio of the number of teeth of the sun gear to that of the ring gear of said double pinion type planetary gear mechanism is generally 0.50.

3. A method of operating a transmission according to claim 1, wherein said first clutch and said first brake are operatively engaged with said second one way clutch being automatically engaged to provide a first and lowest speed stage; said second clutch is operatively engaged with said first one way clutch being automatically engaged to provide a second speed stage next higher to said first speed stage; said second clutch and said third brake are operatively engaged to provide a third speed stage next higher to said second speed stage; said second and third clutches are operatively engaged to provide a fourth speed stage next higher to said third speed stage; said third clutch and said third brake are operatively engaged to provide a fifth speed stage next higher to said fourth speed stage; and said first clutch and said second brake are operatively engaged to provide a reverse stage.

4. A method according to claim 3, wherein said third clutch and said first brake are operatively engaged to provide an additional speed stage to be positioned between said second speed stage and said third speed stage.

* * * * *